United States Patent

Yap

[11] Patent Number: 6,047,911
[45] Date of Patent: Apr. 11, 2000

[54] METHOD FOR RECLAIMING RUBBER

[76] Inventor: Choo Kiat Yap, Batu 7½, Jalan Tuaran P.S. Bil 10680, Kota Kinabalu, Malaysia

[21] Appl. No.: 09/035,893

[22] Filed: Mar. 6, 1998

[30] Foreign Application Priority Data

Mar. 7, 1997 [MY] Malaysia ............................ PI 9700970

[51] Int. Cl.[7] .................................................. B02C 19/12
[52] U.S. Cl. ...................... 241/23; 241/65; 241/DIG. 31
[58] Field of Search .................... 241/DIG. 31, DIG. 37, 241/23, 29, 65

[56] References Cited

U.S. PATENT DOCUMENTS

| | | |
|---|---|---|
| 4,211,676 | 7/1980 | Watabe et al. . |
| 4,844,350 | 7/1989 | Larsson ............................ 241/DIG. 31 |
| 5,411,213 | 5/1995 | Just .................. 241/DIG. 31 |
| 5,588,600 | 12/1996 | Perfido et al. .................... 241/DIG. 31 |
| 5,634,599 | 6/1997 | Khais et al. ....................... 241/DIG. 31 |

FOREIGN PATENT DOCUMENTS 0 690 091    1/1996    European Pat. Off. .

OTHER PUBLICATIONS

R. Schaefer and R.A. Isringhaus, "Reclaimed Rubber" in *Rubber Technology*, 3rd Ed., Van Nostrand Reinhold Co., New York, p. 505–517 (1987).

*Primary Examiner*—Mark Rosenbaum
*Attorney, Agent, or Firm*—Pennie & Edmonds LLP

[57] ABSTRACT

A method for reclaiming rubber comprising the steps of (a) producing scrap from used rubber materials; (b) milling said scrap to produce rubber crumbs characterised in that the crumbs of said milling step (b) are continuously fed to the milling machine at compression force preferably 100 metric tonnes and the temperature of the crumb feed being milled is maintained at a suitable temperature so as to obtain the reclaimed rubber. The preferred embodiment of the invention provides for a cooling system to keep the temperature of the milling process below 100° C., the pressure being exerted by the mill rolls at close to zero nip with roll speeds at a 1:1.6 ratio, and the surfaces of the rolls are smoothen. Most preferably, the compression force is equivalent to 200 metric tonnes in weight and the crumb feed is continuously milled for about 30 revolutions.

12 Claims, 4 Drawing Sheets

METHOD FOR RECLAIMING RUBBER

FIELD OF INVENTION

This invention relates to a method for reclaiming rubber using physical means. Rubber scrap are milled at high compression pressure and maintained at relatively low temperature to produce pre-vulcanised state of rubber sheets without the use of any chemical reactants. The pre-vulcanised rubber sheets may be moulded and re-vulcanised again using conventional chemicals and methods.

BACKGROUND

One method of recycling used rubber products is to grind it into fine scrap and work it into new rubber as an elastomeric filler. Reclaiming rubber from rubber articles usually entails devulcanising said articles and rendering the devulcanised material mouldable and revulcanisable into new articles. One of the earliest non-chemical devulcanisation methods is the "heater process" patented by Hiram L. Hall in 1858 which comprises subjecting lightly vulcanised used rubber products (boots and shoes) to steam heat so that the used rubber can be successfully devulcanised by the heat at a temperature higher than 150° C. and for a period longer than the original vulcanisation.

Later, chemical processes were used in devulcanising the sulphur crosslinks, including the use of mixtures of compounds including conventional accelerators as in U.S. Pat. No. 4,211,676 (Bridgestone) and EP-A-0,690,091 (Sekhar).

However, in all these chemical reclaiming processes, the initial stage is physically reducing the size of scrap rubber, usually by grinding used rubber materials to obtain the scrap. This is most generally accomplished using corrugated two-roll cracker mills or a rotating cutter to obtain a rip, tear or shear action, while others have rotating-knife slitter actions (Schaefer and Isringhaus, "Reclaimed Rubber", *Rubber Technology,* 3rd ed.).

The rubber crumbs obtained from the initial milling stage may be crumbed or lumped together to form blocks using oils and petroleum-based products and used as filler materials or in the aforementioned chemical processes for reclaiming rubber. Such conventional physical methods normally use rubber scraps obtained from used rubber products that have high tensile strength (due to their high content of carbon black and lower rubber content of about 40%) such as vehicle tires.

Highly elastic used rubber products such as surgical gloves and inner tubes of tires which have higher rubber content (about 70%) are more difficult to cut due to its elasticity and therefore not normally used as raw materials in reclaiming process. The conventional processes avoid such high rubber content products since it would be difficult to physically cut such elastic scraps and devulcanise enough of the sulphur crosslinks to enable effective revulcanisation and reclamation.

SUMMARY OF THE INVENTION

It has now been discovered that sufficient devulcanisation of used rubber scrap may be achieved without the use of additional chemicals or steam treatment but by purely physical means and at relatively low temperatures. A method for reclaiming rubber comprise the steps of (a) producing scrap from used rubber materials; (b) milling said scrap to produce rubber crumbs characterised in that the crumbs are continuously fed to the milling machine at compression force preferably 100 metric tonnes and the temperature of the crumb feed being milled maintained at a suitable temperature so as to obtain the reclaimed rubber.

In one embodiment, the temperature is maintained by providing a cooling system to keep the temperature of the milling process below 140° C. Preferably, the cooling system comprises a water-cooled circulation system and the temperature is maintained thermostatically within a range of 70° C. to 100 ° C.

In another embodiment of the invention, the pressure exerted by the mill rolls is complemented with shearing force by turning the rolls at different speeds. Preferably, the roll speeds are at a 1:1.6 ratio. More preferably, the surface of the rolls are smooth and the nip between said rolls are close to zero nip. Most preferably, the pressure exerted by the rolls is equivalent to the weight of 200 metric tonnes and the crumb feed is continuously milled for about 30 revolutions by a single milling machine or by continuous machines placed in series where the output of one milling machine is fed into the next milling machine.

In yet another embodiment, the reclaimed rubber is obtained from used rubber materials. Preferably, the reclaimed rubber is mixed with one or a combination of virgin natural rubber, virgin or used synthetic rubber, fillers or other materials used in conventional rubber compounding processes. Alternatively, the reclaimed rubber is mixed with one or a combination of virgin natural rubber, virgin or used synthetic rubber, fillers or other materials used in conventional rubber processing and vulcanisation methods during the manufacture of recycled rubber products.

It would be apparent to a person skilled in the art that the rubber material reclaimed using any one of the preceding methods may be compounded and/or bulk-produced. Similarly, it would be apparent that an apparatus or means need to be specifically designed or modified to perform the methods of the present invention. The reclaimed rubber material according to the invention may be made in whole or in part into an article.

DETAILED DESCRIPTION OF INVENTION

Figure 1:
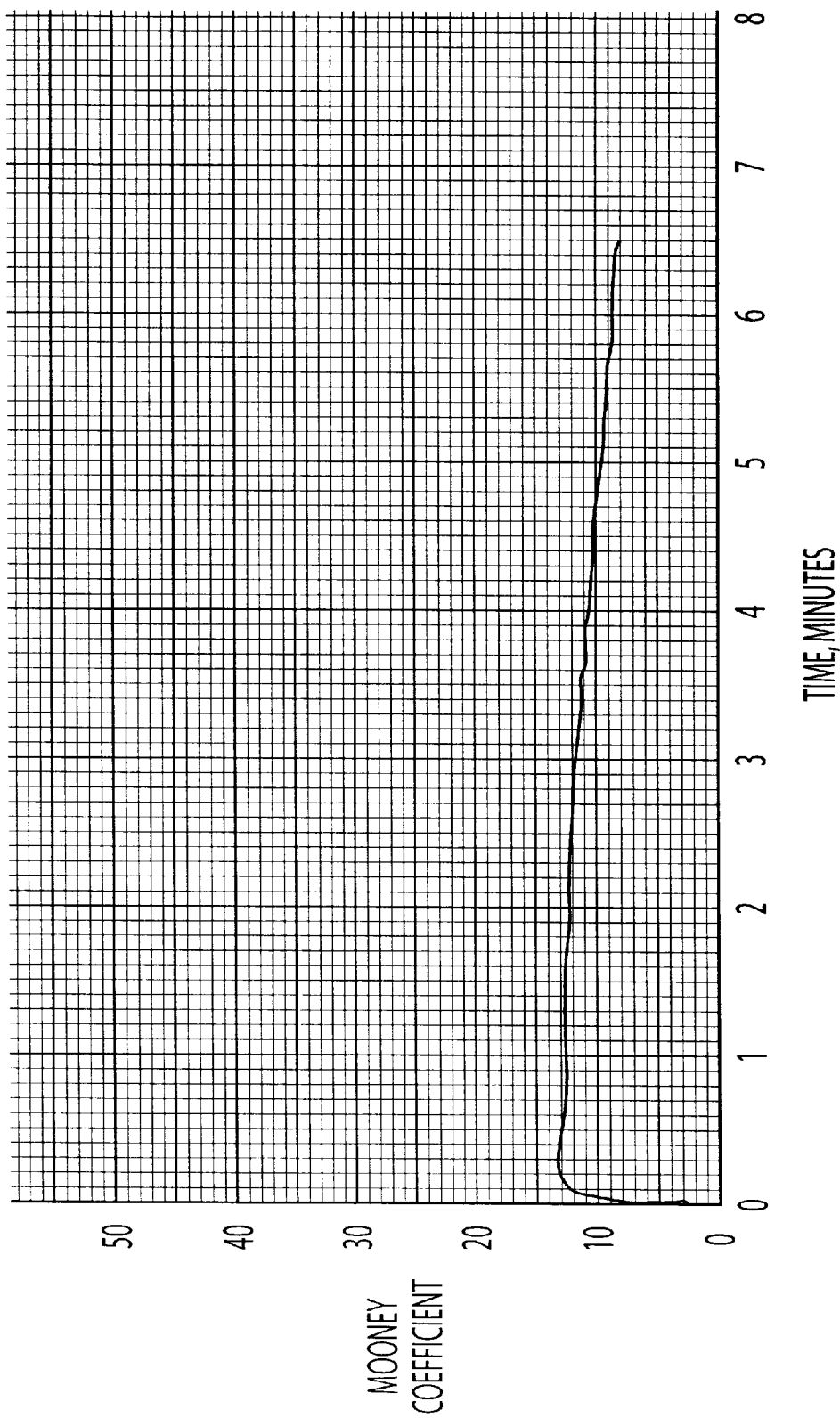
FIGS. 1–4 show graphs of the results of the respective examples discussed in the specification.

The invention will now be described in detail with respect to the various features and embodiments described hereinafter which are to be understood as illustrative examples only and not to be construed as restricting or the only possible embodiment.

The method of the present invention for reclaiming rubber from used rubber products to produce revulcanisable rubber material comprises the steps of producing scrap from used rubber materials and then feeding said scrap into a milling machine to produce rubber crumbs. The novelty of the invention lies in that the crumbs from the milling step are continuously fed to be milled at compression force preferably 100 metric tonnes in weight and the temperature of the crumb feed being milled is maintained not to "burn" the reclaimed rubber.

The step of producing scrap rubber from used rubber materials may be any of the conventional mechanical methods wherein used rubber products such as rubber boots, soles, tires, inner tubes, etc. are cut into scraps by rotating cutter machines that employ cut, rip, tear, or shear action. The rubber scrap may then be mixed with rubber dust, shavings and other rubber particles which are of small sizes.

The next step involves milling the rubber scrap using a twin-roll milling machine to produce rubber crumbs. Each roll normally turns in different directions (clockwise and anti-clockwise) so that the feed may be milled by compression force. When the revolution of the rolls are provided with different speeds, shearing force is produced as well. The result of such milling is the formation of rubber crumbs which may be lumpy.

It is now discovered that if the crumbs are milled at sufficiently high compression force, said crumbs may be turned into reclaimed rubber that is a homogeneous, stretchable but tacky sheet which is believed to be substantially or semi-devulcanised rubber. This material, as will be shown hereinafter, it easily mouldable into shapes of articles, and may be revulcanised under conventional methods and conditions. It is speculated that the extremely high compression force breaks down the sulphur cross-links. Crackling sounds and smell of sulphur could be heard and smelled as the crumbs are milled through the first few revolutions.

Apparatus

Since no commercially available mill roller machine could be found to provide the required high compression force, the machines used during the research and development of the present invention are custom-made based on commercially available rubber sheeting mills to achieve the high compression pressure provided by the twin rolls.

Preferably, the nip between rolls is zero or at least as close to zero as possible so that the crump feed fed into the rolls may receive the maximum compression pressure. Means to exert the pressure or to hold the rolls close to zero nip, which is usually screw press means, is facilitated by a hydraulic press for more uniform and higher pressure across the rolls. When the nip between the front and the rear rolls is set close to zero nip, the turning of one roll does not exert any pressure on the other roll when there is no feed.

The pressure exerted by the rolls can be from 20 metric tonnes. Preferably, the pressure exerted by the rolls is about 100 metric tonnes and above, and more preferably, 200 metric tonnes.

The surface of the rollers are made of extremely hard and metallic materials and are smoothened to reduce surface abrasive wear due to the high pressure exerted on the crump feed during milling.

Preferably, in addition to the compression force, shear force is introduced to the milling process by varying the speeds of the two rolls. While conventional or commercially available milling machines normally provide a front roll to rear roll ratio of about 1:1.09 to 1:1.15, to provide maximum friction between the rolls so as to maximise the shear force, the ratio is preferably provided at about 1:1.6.

Due to the high compression and shearing force during milling, it is anticipated that the surface of the rolls need to be re-smoothened after every 6 months of operation.

Example of Apparatus

An example of a commercially available rubber sheeting mill that may be customised to provide the high compression and shear pressure required for the present invention is as follows:

| | |
|---|---|
| Manufacturer: | Dalian Rubber & Plastics Machinery Works, Dalian, China. |
| Name of machine: | DXS Rubber Sheeting Mill |
| Model: | XKY-660 or XKY-660C |

| | |
|---|---|
| Main technical specification: | |
| Diameter of roll: | 660 mm |
| Length of roll: | 2130 mm |
| Working speed of roll: | 30 m/min (may be modified to a much slower speed) |
| Ratio of front:rear roll: | 1:1.08 (modified to 1:2) |
| Max. adjustable nip: | 12 mm (modified to zero nip) |
| Capacity per batch: | 165 kg (may be modified to 500 kg) |

It has been found that where one milling machine of the type modified as described above is used, it takes about 30 revolutions for the crumbs to arrive at the reclaimable rubber, which is in the form of a stretchable, tacky sheet. The crumbs may form a lumpy state after the first few revolution and if the tail end of the batch is re-fed into the mill, a continuous sheet may be formed so that after about 30 revolutions, the reclamation process is substantially completed.

It is anticipated that a production line comprising a series of 25 roll mills modified according to the preceding description may be set up to achieve continuous processing of rubber crumb feed to produce the reclaimable rubber material of the present invention.

Internal mixing machines or Banbury machines may be used for mixing raw materials of used rubber products prior to feeding to the roll millers at high pressure according to the present invention. The use of such mixing machines will enable a more efficient kneading action and render the raw materials susceptible to the high compression pressure during milling.

Temperature

The high friction caused by the high differential speed ratio of 1:1.6 between the front and rear rolls inevitably cause temperature of the feed and rolls to rise rapidly. As the rubber crumb feed is being crushed and slowly being rendered into the reclaimable and revulcanisable state (i.e. in stretchable, tacky sheets), it is therefore important that the rising temperature be controlled so that it does not rise above the temperature which will "burn" the reclaimed rubber.

Preferably, a cooling system is provided to the twin roll milling machine so that the temperature of the rollers may be monitored and controlled at below 100° C. More preferably, the cooling system comprises a water-cooled system for circulating and dissipating the heat generated from the rolls. Another preferred embodiment is to have the temperature maintained thermostatically within a range of 70° C. to 100° C.

If the rubber material being milled and reclaimed is allowed to heat up to beyond 100° C., the quality of reclaimed rubber produced will not be of a good quality in terms of pre-vulcanisation and re-mouldability. If the rubber material is continuously milled and the temperature allowed to soar beyond 140° C., the reclaimed rubber would "burn" resulting in a "carbonised" state.

If the rubber material being milled is below 70° C., then a longer process is required since the number of revolutions to obtain the reclaimed rubber from the rubber crump is increased. The number of revolutions has to be increased proportionately with the decrease in temperature.

The high compression pressure method of roll milling of the present invention is particularly advantageous in reclaiming highly elastic used rubber products such as surgical gloves and inner tubes of tires which are difficult to cut and milled with conventional reclaiming methods.

Ironically, such products have a much higher rubber content which is useful for reclaiming purposes.

Used rubber products that are considered desirable raw material by conventional rubber reclaiming methods are those that have high tensile strength (i.e. strong elasticity in contrast with visco-elasticity of soft elastomers as in surgical gloves) such as tires and boots which has a high percentage of fillers such as carbon black.

Revulcanisation

Depending on the quality of the end-product, virgin rubber, fillers or even virgin synthetic rubber may be added to the reclaimed rubber to achieve the desired quality. Generally, the freshly reclaimed rubber of the process of the present invention may be weighed to determine how much virgin rubber and other materials are to be added. The weights and proportions of additional materials determine how much vulcanising agents, such as sulphur.

EXAMPLES

A few working examples will now be described to illustrate the revulcanisability of the reclaimed rubber of the invention in the process of making recycled rubber products.

Example 1

Control

A control batch of the reclaimed rubber of the present invention (which is stretchable and tacky, in appearance and feel) is tested without additional chemicals or treatment in a rheometer. Result: No vulcanisation occurs. (See graph in FIG. 1).

TEST BATCHES

The test batches are mixed with virgin natural rubber, fillers, vulcanising agent and accelerators depending on the type of end-product required. For example, carbon black may be added as a filler to harden the end-product for use as tire thread. Two types of accelerator compounds used are N-cyclohexylbenzothiazole-2-sulfenamide (CBS) and morpholinothio benzothiazole (MBS). An example of a commercially available rubber accelerator composition is Santocure™ by Monsanto.

Example 2

| Tire inner lining | |
| --- | --- |
| Reclaimed rubber: | 98.55% w/w |
| Vulcanising agents: | |
| sulphur | 0.8% |
| Accelerators: | |
| CBS | 0.5% |
| MBS | 0.15% |

Figure 2:
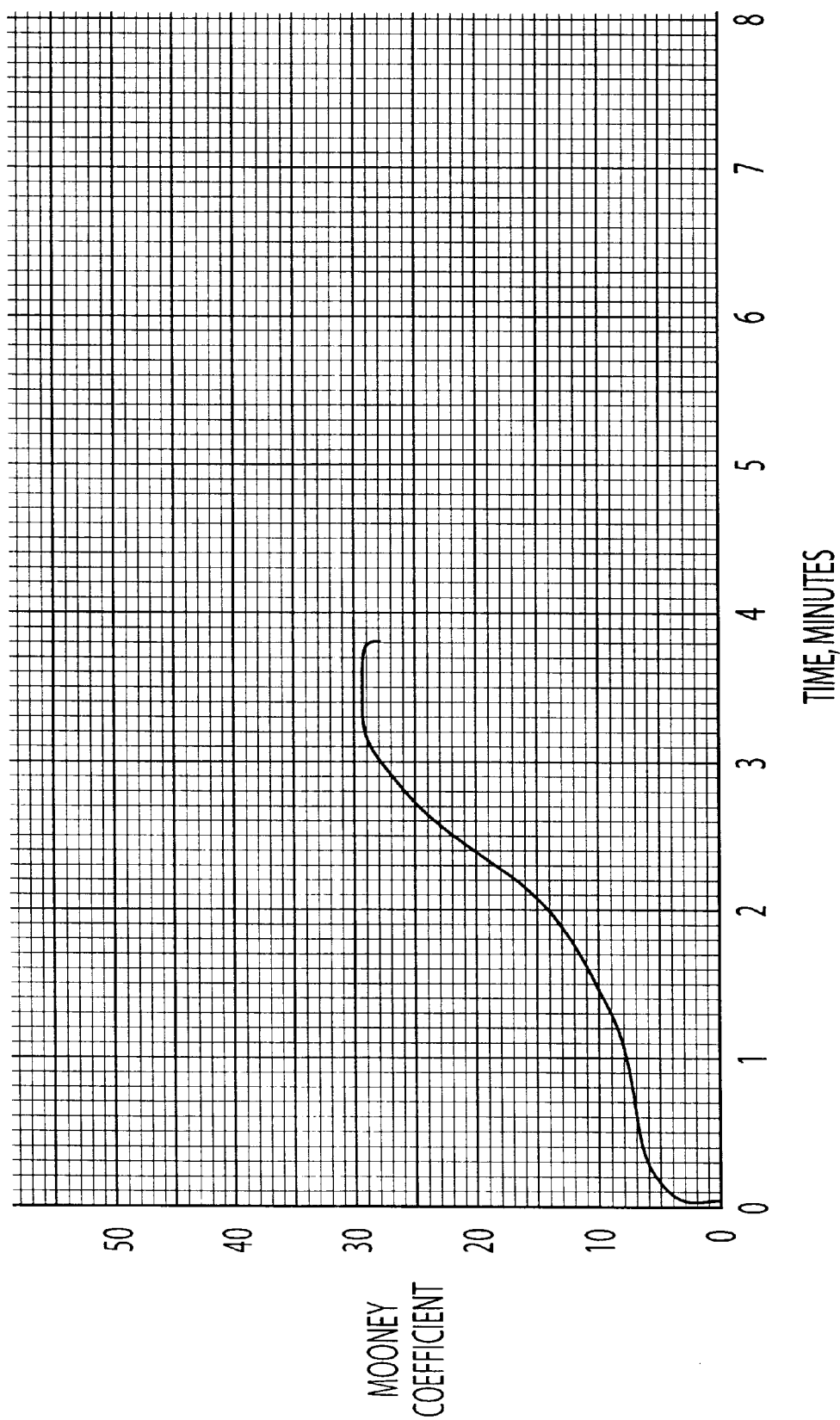

The above raw materials are milled continuously for 5–10 minutes before being moulded into the required tire flap diameter size. The mould is thereafter heated to re-vulcanise and allowed to cure. A sample is tested in a rheometer which results are presented herewith as a graph in FIG. 2.

Example 3

| Tire inner lining (with filler) | |
| --- | --- |
| Carbon black is added for extra tensile strength in the inner lining flaps. | |
| Reclaimed rubber: | 78.55% |
| SMR[1]-20 | 7% |
| Carbon black | 13% |
| Vulcanising agent: | |
| sulfur | 0.8% |
| Accelerators: | |
| CBS | 0.5% |
| MBS | 0.15% |

[1]Standard Malaysian Rubber

Figure 3:
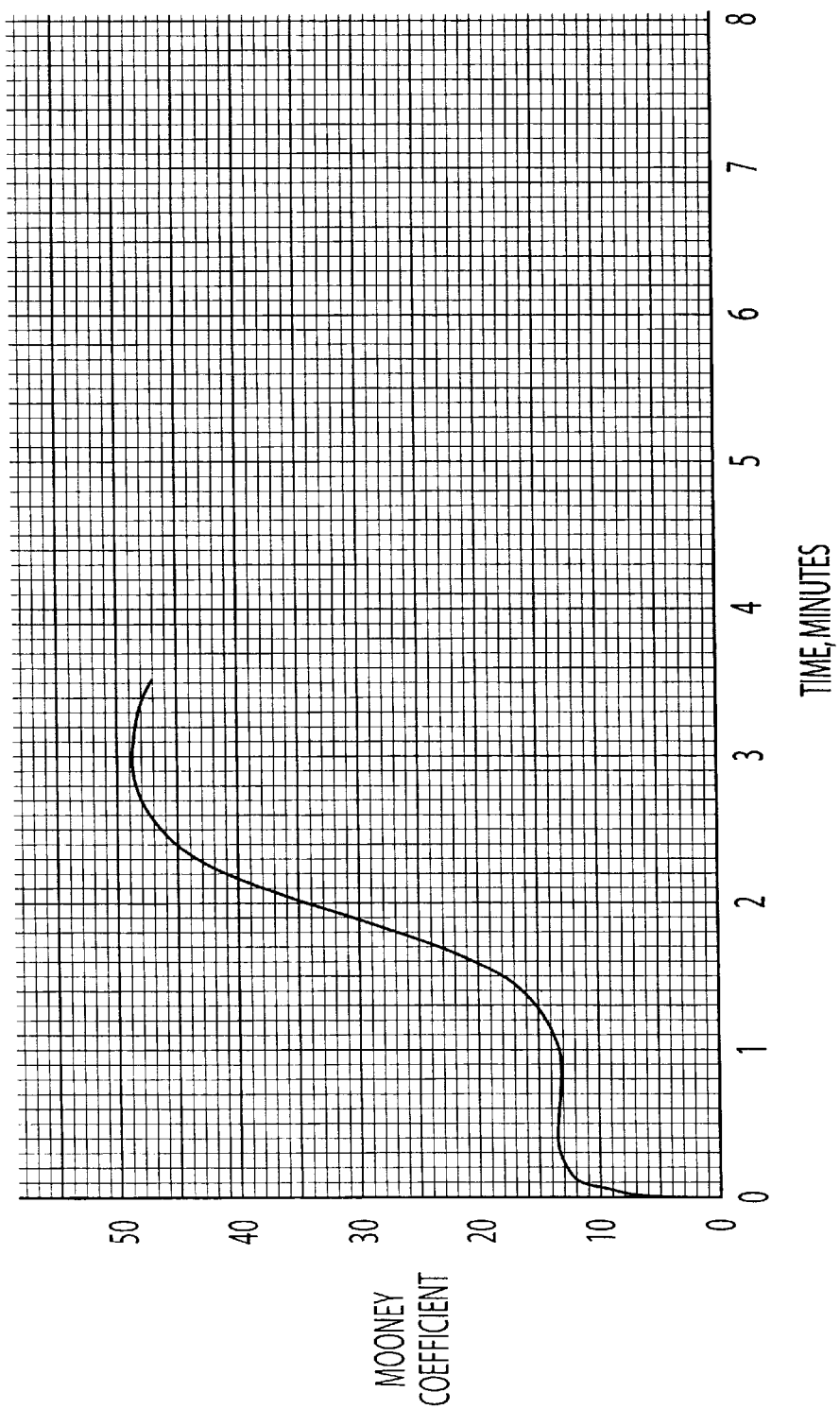
Figure 4:
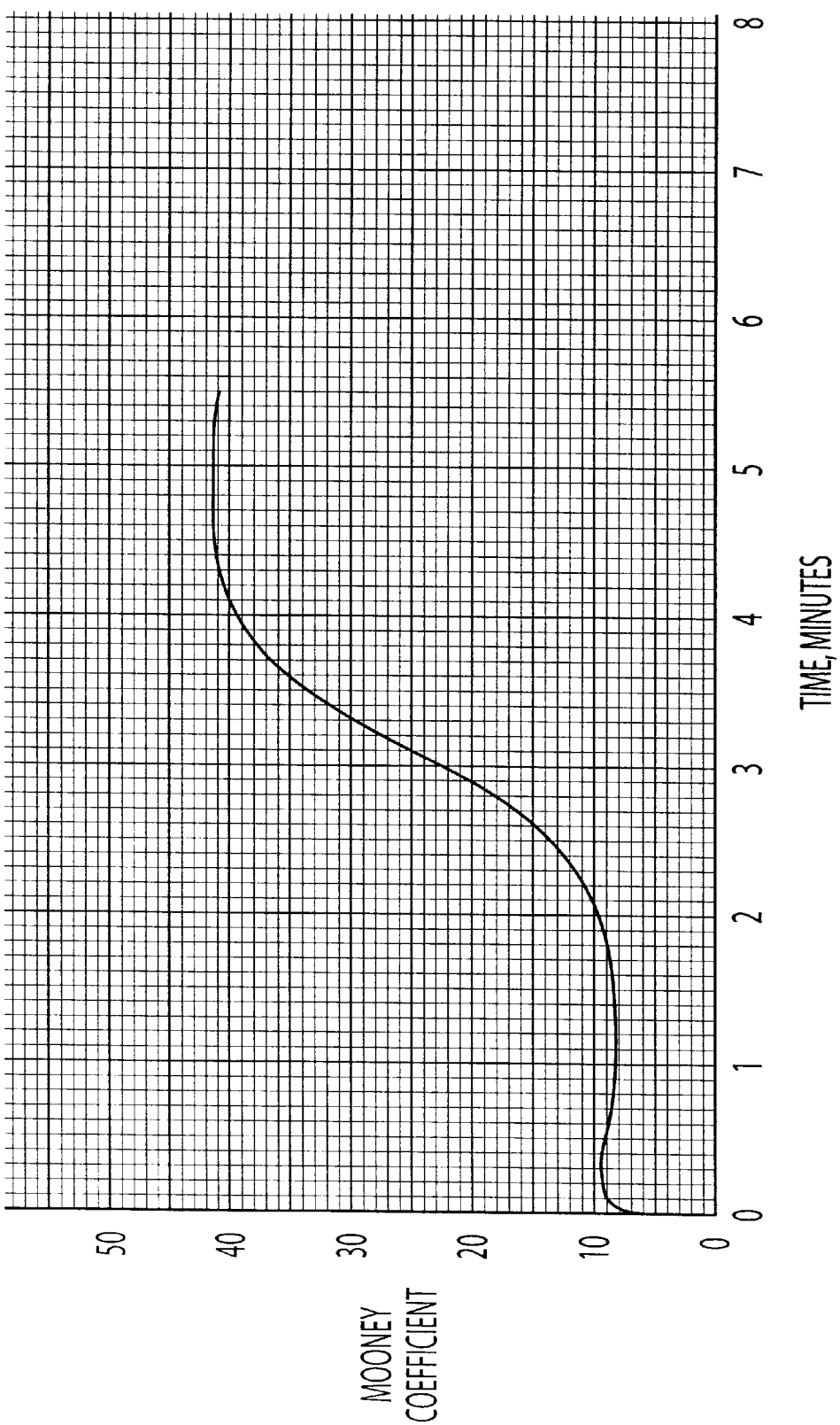

The example is re-vulcanised using the above-mentioned method and the result is shown in FIG. 3.

Example 4

| Tire retreads | |
| --- | --- |
| Reclaimed rubber: | 50% |
| Compound NR (Masterbatch SMR[1] rubber with 50% with carbon black 50%) | 50% |
| Vulcanising agents: | |
| sulphur | 0.03% |
| Accelerators: | |
| CBS | 0.01% |
| MBS | 0.01% |

[1]Standard Malaysian Rubber

In the invention being thus described, it will be obvious to the person skilled in the art that the specific procedures and embodiments described herein may be varied in many ways. Such variations are not to be regarded as a departure from the scope of the invention.

Described above are novel features and advantages which the skilled person in the art will appreciate. It is to be noted that in addition to the specific examples given above it is possible to use equivalent or substitute configurations or designs which a skilled person will appreciate and be able to achieve the essence of this invention. These are each independent aspects of the present invention and are to be construed as falling within the scope and spirit of the following claims.

I claim:

1. A method for producing reclaimed rubber which comprises producing rubber crumbs from used rubber materials;
   continuously providing said crumbs to a milling zone;
   milling said crumbs in the milling zone at a compression force equivalent to at least 100 metric tons; and
   maintaining the crumbs at a sufficient temperature to avoid burning and obtain said reclaimed rubber in a revulcanisable state.

2. The method according to claim 1 wherein the temperature is maintained by a cooling system that keeps the temperature of the milling below 140° C.

3. The method according to claim 2 wherein the cooling system comprises a water-cooled circulation system and the temperature is maintained thermostatically within a range of 70° C. to 100° C.

4. The method according to claim 1 wherein the crumbs are fed between a pair of rolls of the milling zone and the compression force is complemented by a shearing force produced by turning the rolls of the milling machine at different speeds.

5. The method according to claim 4 wherein the roll speeds are at a 1:1:6 ratio.

6. The method according to claim 4 wherein the rolls have smooth surfaces and a nip between said rolls which is close to zero nip.

7. The method according to claim 1, wherein the pressure is 200 metric tones and the crumbs are continuously milled for about 30 revolutions of rolls by a single milling machine or continuous milling machines placed in series.

8. The method according to claim 1 which further comprises mixing the reclaimed rubber with one or a combination of virgin natural rubber, virgin or used synthetic rubber, or fillers.

9. An apparatus for producing reclaimed rubber comprising a means for producing rubber crumbs from used rubber materials;

at least one feeding means for continuously providing said rubber crumbs for processing;

milling means for applying force to said crumbs at a compression force of at least 100 metric tons; and (c) means for maintaining the crumbs being milled at a temperature sufficient to avoid burning and obtain said reclaimed rubber in a revulcanised state.

10. The apparatus of claim 9, wherein the compression force is at least 200 metric tons.

11. The apparatus of claim 9, where in the temperature maintaining means comprises a cooling system that maintains the temperature of the crumbs below 140° C.

12. The apparatus of claim 9, where in the temperature maintaining means comprises a cooling system that maintains the temperature of the crumbs between 70° C. and 100° C.

* * * * *

UNITED STATES PATENT AND TRADEMARK OFFICE
CERTIFICATE OF CORRECTION

PATENT NO. : 6,047,911

DATED : April 11, 2000

INVENTOR : Choo Kiat YAP

It is certified that error appears in the above-identified patent and that said Letters Patent is hereby corrected as shown below:

Column 7, line 12: change "tones" to --tons--.

Signed and Sealed this

Thirteenth Day of February, 2001

Attest:

NICHOLAS P. GODICI

Attesting Officer

Acting Director of the United States Patent and Trademark Office